UNITED STATES PATENT OFFICE.

JENS HERMAN CHRISTENSEN, OF SÖLLERÖD, HOLTE, DENMARK.

METHOD OF PRODUCING PHOTOGRAPHIC FILMS OF VARYING POROUSNESS.

1,256,981. Specification of Letters Patent. Patented Feb. 19, 1918.

No Drawing. Application filed March 9, 1916. Serial No. 83,101.

*To all whom it may concern:*

Be it known that I, JENS HERMAN CHRISTENSEN, a subject of the King of Denmark, residing at Söllerød, Holte, Denmark, have invented a new and useful Method of Producing Photographic Films of Varying Porousness; and I do hereby declare the following to be a full, clear, and exact description of the same.

In my pending application No. 801,227, filed under date of November 15th 1913, I have disclosed that during the developing certain photographic films can be caused to assume an augmented porousness in the places where the developing has taken place, and that thereafter this augmented porousness can in various manners be used for producing pictures and etchings. According to the present invention the said difference in porousness is not produced to any essential degree during the developing, but on the contrary through a subsequent process, by virtue of which the non-reduced silver salt through treatment with suitable substances is transformed into a pore filling compound. Films can therefore be used which have originally a considerable porousness, which will cause the developing process to be effected more regularly.

Specially adapted for the said purpose is a treatment of the silver salts with a solution of an alkali sulfid in which is found a surplus of sulfur. Such a solution will for instance perfectly fill up the pores of a dry collodio-silver-bromid film, even if the same is rendered porous by adding to the film glycerin, benzoic acid, pyrocatechin or similar soluble substances. Even with many gelatin plates through such sulfur treatment—if a surplus of sulfur is found—there will be obtained an effect which will be strongly marked if the gelatin is hardened beforehand, for instance with chrome alum. This pore filling effect can also be obtained by iodids, rhodanids and certain other substances; however the sulfur compounds seem to have the best pore-filling power. Substances such as sulfostannates, sulfoantimonate of sodium ($Na_3SbS_4 9H_2O$), and similar substances which easily give off sulfur during the process may also be used. The highest degree of filling or obstruction of the pores is obtained if a solvent for the silver salt, for instance a rhodanid, is combined with one of the said sulfur compounds, and such mixture will as a rule be necessary in order to obtain a perfect obstruction when gelatin films are in question. The degree of filling up is modified through addition of various substances. The addition of bromids or bichromates, for instance augments the same, whereas addition of iodids or basic reacting substances reduces the same.

The said process may be employed for producing pictures and etchings. For instance printing plates for producing color photographs from part negatives can be produced in a simple and speedy manner. For this purpose 3 plates of glass, metal, celluloid or the like are provided with films of a colloid, for instance gelatin containing a dye of the proper color. The dyed films are thereafter provided with collodio-silver-bromid films, which are made suitably porous through addition of glycerin, pyrocatechin or the like. The part negatives are then copied complementarily on these three plates, *i. e.* the negative which is taken through a red filter is copied on a plate which contains a bluegreen dye and so on. The color plates are developed washed and during some minutes treated with a diluted alkali sulfid solution containing an excess of sulfur, for instance 1–10 parts of the solution to 1000 parts of water, which fills up the pores where no developing has taken place. These color plates can now be used as printing plates and by being one after the other copied on the same sheet of paper give a correct color paper picture, or on a transparent film a diapositive. As the plates may contain considerable quantities of dye, they may be used for printing of a larger number of pictures.

Instead of three part negatives may be used a color negative, for instance an autochrome negative, the copying being done through a red filter on the blue green plate and correspondingly complementary on the other two plates. In this case the collodio-silver-bromid film must be made color sensitive which can be done in a known manner by adding eosine, etc. It has been proved that this color sensitiveness is sometimes spoiled if the dye from the underlying colloid layer diffuses into the alcohol ether mixture in which the collodio-silver-bromid is generally dissolved. This, of course, can be avoided by using dyes or color substance compounds which do not dissolve in alcohol ether; but it can also be avoided by the alcohol ether being substituted wholly or partly by other solvents for instance acetone, amylacetate, benzin, etc.

Instead of using plates which contain dyes in themselves plates which are free of dye may also be used, the plates being only subsequent to developing and the above described treatment provided with dye by being soaked in a dye solution.

When the colored copy is to be produced from a color negative, it is important to be able to secure the correct registering of the printing plate and the material to be printed on. This can be obtained when the printing plates are arranged in frames provided with holes, while the colored negative and the material to be printed on is clamped in the frame which is provided with corresponding guiding pins, which provisions are used during the copying as well as during the printing.

Having thus fully described my invention, I claim as new and desire to secure by Letters Patent:

1. A process for producing a film, the different parts of which have a porousness depending upon the action of light on said parts, which comprises exposing a film containing a sensitive silver compound to the action of light, developing said film and then treating the reduced and non-reduced parts of said silver compound in said film with a solution which transforms the non-reduced parts of said silver compound into a pore-filling substance.

2. A process for producing a film, the different parts of which have a porousness depending upon the action of light on said parts, which comprises exposing a film containing a sensitive silver compound to the action of light, developing said film and then treating the film with a solution containing a soluble sulfur compound which readily gives off sulfur, thereby reducing the penetrability of the parts of said film containing the non-reduced silver substantially as set forth.

3. A process for producing a film, the different parts of which have a porousness depending upon the action of light on said parts, which comprises exposing a film containing a sensitive silver compound to the action of light, developing said film, and then soaking the film in a solution containing a soluble sulfur compound which readily gives off sulfur, and a solvent for said silver compound thereby reducing the penetrability of the parts of said film containing the non-reduced silver substantially as set forth.

In witness whereof I have hereunto set my hand in presence of two witnesses.

JENS HERMAN CHRISTENSEN.

Witnesses:
　CECIL VILHELM SCHON,
　VIGGO BLOM.